(12) United States Patent
Hanechak

(10) Patent No.: US 7,437,321 B2
(45) Date of Patent: Oct. 14, 2008

(54) PRODUCT DESIGN SYSTEM AND METHOD

(75) Inventor: Brian D. Hanechak, Waltham, MA (US)

(73) Assignee: Vista Print Technologies Limited, Hamilton (BM)

( * ) Notice: Subject to any disclaimer, the term of this patent is extended or adjusted under 35 U.S.C. 154(b) by 541 days.

(21) Appl. No.: 11/058,834

(22) Filed: Feb. 16, 2005

(65) Prior Publication Data

US 2006/0184432 A1 Aug. 17, 2006

(51) Int. Cl.
G06Q 30/00 (2006.01)
G06F 17/00 (2006.01)
G06F 3/00 (2006.01)
G06F 3/048 (2006.01)

(52) U.S. Cl. .......................... 705/27; 705/26; 715/748; 715/764; 715/810

(58) Field of Classification Search .................... 705/26, 705/27; 715/733, 748, 764, 810
See application file for complete search history.

(56) References Cited

U.S. PATENT DOCUMENTS

| 6,052,514 A * | 4/2000 | Gill et al. ...................... 715/733 |
| 7,216,092 B1 * | 5/2007 | Weber et al. ................... 705/26 |
| 2004/0046788 A1 * | 3/2004 | Keane et al. .................. 345/748 |
| 2004/0243930 A1 * | 12/2004 | Schowtka et al. ............ 715/513 |

* cited by examiner

*Primary Examiner*—Yogesh C Garg
(74) *Attorney, Agent, or Firm*—Robert L. Dulaney; Jessica J. Costa

(57) ABSTRACT

Computer-implemented product design creation system and method for quickly developing a product design having desirable component elements. Multiple candidate product designs are simultaneously displayed for review. Controls are provided allowing a reviewer to enter a preference level for individual component elements of each of the displayed designs. A new set of candidate designs is created based on the entered preference levels. The new candidate designs are displayed for further review and further preference level selection.

12 Claims, 5 Drawing Sheets ized custom product design. After the product has been
PRODUCT DESIGN SYSTEM AND METHOD

FIELD OF THE INVENTION

The present invention relates to online creation of product designs.

BACKGROUND

Many Web sites provide online design services for users desiring to create customized materials, such as business cards, postcards, brochures, invitations, announcements, and the like, from their home or office computer. These sites typically provide their customers with the ability to access the site, review available design templates, and use software tools provided by the site to select a template, add text or other content, and perform various modifications to create a personalized custom product design. After the product has been designed by the user, the sites also typically allow the user to place an order for the production and delivery to the user's home or business of quantities of high quality, printed products of the type that the user is not capable of producing with the printer systems typically connected to most personal computer systems.

Despite the widespread availability and use of home and business computers and despite the advantages in cost, speed, and convenience provided by online design and ordering systems, many individuals and business in need of custom products are still reluctant to use software tools to prepare their products. To serve and assist these people, some printing service providers, such as VistaPrint.com operated by VistaPrint Limited, employ design representatives who will work with the customer and will perform some or all of the product design for the customer.

Traditionally, the process of designer-assisted creation of custom products involves multiple separate review sessions with intervening periods of hours, or more often, days. Known tools for designing electronic products typically are not adapted to "real time" collaborative development of a product design. Traditionally, a design services representative will collect information about the customer and take the order, but the customer at this point disengages from the process. At some later time, without direct customer participation, a designer will review the order and create a candidate design for review by the customer. The customer is then contacted by phone or email and requested to review the candidate design. A representative may participate in the review process, but again typically for the purpose of noting any comments or modifications requested by the customer. After delivering comments, the customer again usually disengages from the process. The designer, again separately, modifies the design for customer. This process may be repeated one or more times.

Many potential problems are inherent in this approach. For example, delays may lead to customer frustration, it may prove difficult or time consuming to contact the customer when the new design is ready for review, and, in some cases, the customer may have a change of mind and decide to terminate the project, resulting in wasted effort by the designer.

To increase customer satisfaction and also increase development speed and productivity of the designers, there is clearly a need for systems and methods that facilitate the rapid cooperative development of custom personalized designs during the course of a single conversation with a customer.

SUMMARY

The present invention is directed at satisfying the need for systems and methods that allow for real time development of customized product designs.

In one aspect of the invention, multiple designs are displayed simultaneously to a reviewer. At least one control tool is provided allowing the reviewer to manually set preference levels for individual design components of the displayed designs and generate multiple new designs based on the selected preference levels.

It is an advantage of the invention that multiple new designs reflecting the preference levels set by the reviewer can be quickly developed.

Other objects, features, and advantages of the invention will be better understood from reference to the accompanying drawings, description, and claims.

DESCRIPTION

Figure 1:
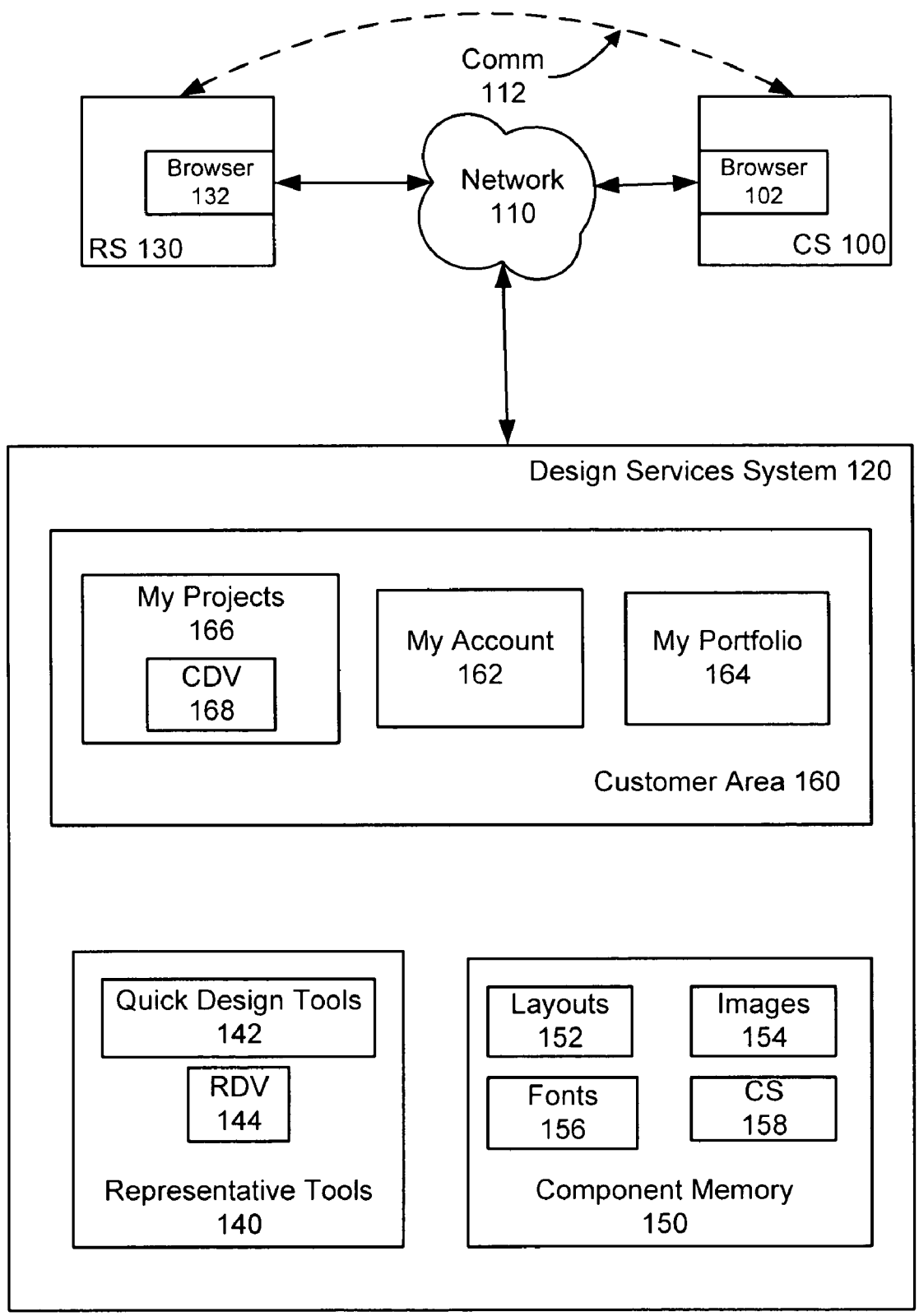
FIG. 1 is a schematic representation of a system with which the invention can be employed.

Referring to FIG. 1, customer system (CS) 100 is a typically equipped modern personal computer, but a portable computer, tablet computer, or other device having appropriate technical capabilities could be employed. CS 100 has the typical internal systems and components, including a processor, memory and data storage systems, a user display, one or more systems for receiving the user's inputs, such as a mouse and keyboard, and a system for supporting connection to and communication with a remote computer system over a network In FIG. 1, CS 100 is running Web browser 102, such as Internet Explorer from Microsoft Corporation, and communicates with a design service provider's remote server system 120 via global communication network 110. The operator of CS 100 is referred to herein as a customer.

Design Services System (DSS) 120 represents a Web server system operated by a service provider for performing product design services for a remote user of a CS 100. DSS 120 could be implemented as a separate product design system or could be implemented as a feature or component of a printing services Web site that also provides other services and products. It will be understood that DSS 120 could be comprised of multiple servers, data storage systems and other components configured to communicate and operate cooperatively.

Representative system (RS) 130 is a typically equipped modern personal computer and associated input/output devices. RS 130 is operated by an employee or agent, hereinafter referred to as a representative, of the design service provider. RS 130 is running Web browser 132 and is in communication with DSS 120 over global network 110. As will be discussed further below, while the representative is actively engaged with a customer at CS 100, the representative will also typically be communicating with the customer via communication connection 112.

For simplicity and clarity of description and presentation, FIG. 1 depicts a single CS 100 and a single RS 130, but embodiments of the invention are not so limited and there could be multiple RS 130 and CS 100 systems simultaneously connected to DSS 120. While RS 130 is shown as connected to DSS 120 via global network 110, this type of connection is not required. RS 130 could communicate with DSS 120 via a direct connection or via a local communication network.

Representative tools 140 represents the set of project management and product design tools used by representatives to exchange information with customers and other representatives, monitor customer accounts, and create and edit customer designs. Within representative tools 140 are quick design tools 142 and representative design view (RDV) 144 that, as will be described in more detail below, allow a representative to view and quickly revise customized product designs in accordance with the wishes and instructions of the customer while the representative and customer are communicating.

Component memory 150 represents a portion of the memory capacity of DSS 120 that is devoted to storing the library of various component elements from which the individual component elements used to create the design of a custom product will be selected. While memory 150 is shown as a single block, it will be understood that the various components elements could be stored in multiple formats on multiple storage devices. In the embodiment shown, the component elements stored in memory 150 are categorized as layouts 152, images 154, color schemes 156, and fonts 158.

Layouts 152 contains a variety of product layout descriptions specifying the size, position, and other attributes of the component elements of the layout, such as text containers, image containers, graphics, z-index values and so forth. Images 154 contains images available for incorporation into product designs and associated image attributes, such as image size, a default color scheme, and searchable keywords provided by the service provider. Color schemes 156 contains sets of complementary colors that have been pre-selected by the service provider to be applied as a group in a design. Fonts 158 contains the fonts that have been made available by the service provider for possible use in the designs. It will be understood that more, fewer, or different categories of components could be employed, if desired. For example, the service provider could also provide a variety of text groups, patterns, clip art, and shapes as selectable component elements. Systems and methods for automatically creating custom product designs using separately stored product component elements are disclosed in co-pending and commonly assigned application Ser. No. 10/449,836 entitled "Electronic Document Modification" filed May 30, 2003 and application Ser. No. 10/679,028 entitled "Electronic Product Design" filed Oct. 3, 2003, the disclosures of which are both hereby incorporated by reference in their entirety.

Customers contacting a representative seeking design services will be required to create an account with the service provider, unless an account already exists from an earlier engagement. Customer area 160 represents the portion of DSS 120 established for this customer and containing the information related to the customer's account. My Account 162 is the customer's main account area for general account information. My Portfolio 164 includes images and information about product designs, if any, that have previously been created and saved for that customer account. My Projects 166 includes images and information about design projects that are currently in process. Each of these areas could contain a plurality of display pages and links allowing the customer to navigate from one page to another and from one portion of customer area 160 to another. Customer design view (CDV) 168, as will be discussed in more detail below, is a Web page accessible to the customer for reviewing candidate product designs prepared by the representative.

Figure 2:
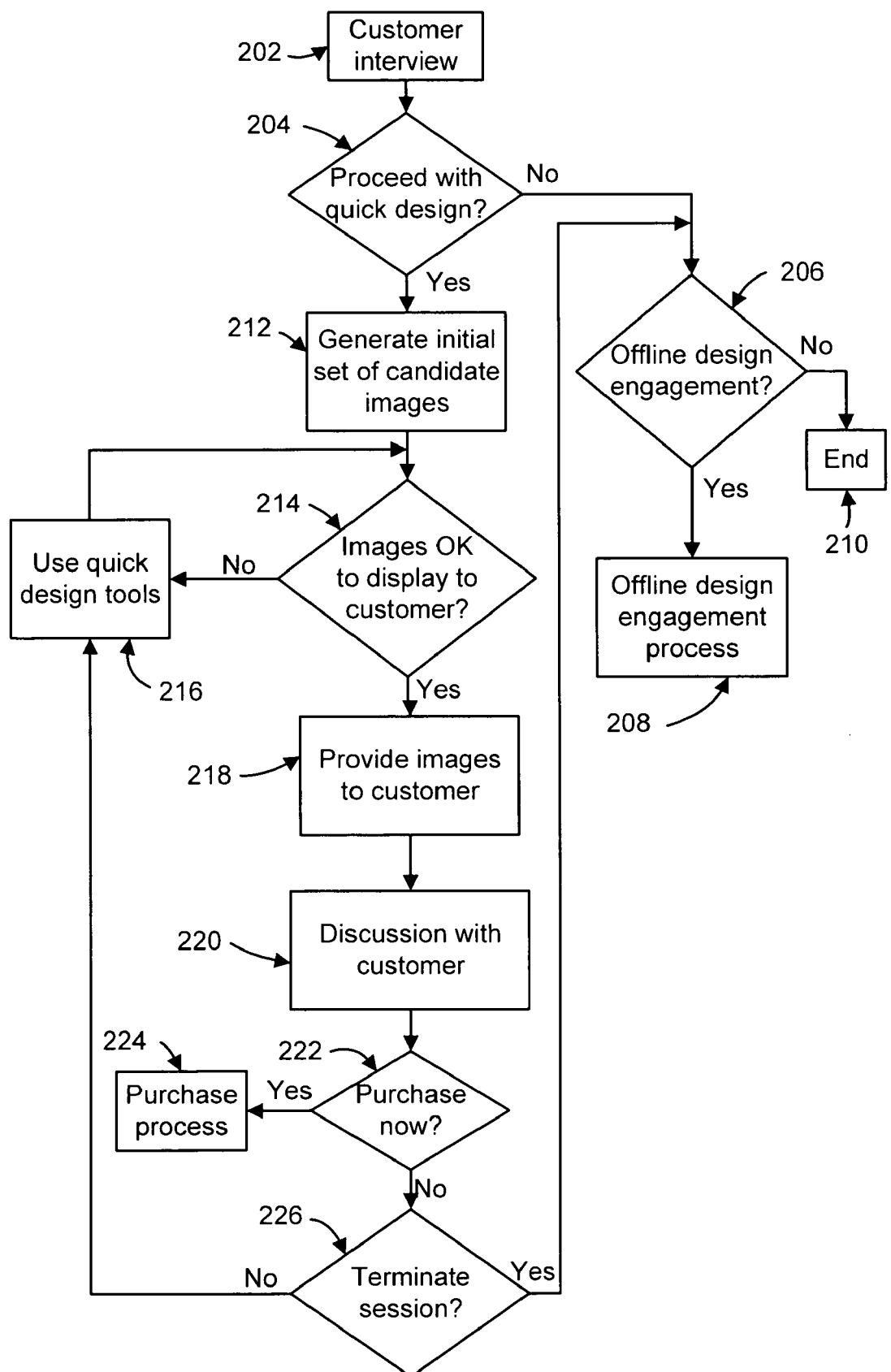
FIG. 2 is a flow chart of a representative method for employing the invention.

FIG. 2 is a flow chart of an illustrative method for employing the invention. At step 202 a communication channel is established between a customer interested in obtaining design assistance and a design representative of the provider. Voice contact would typically be used for greatest speed and efficiency, but communications could also be conducted in other ways, such as by email, online chat, or instant messaging, if appropriate under the particular customer's circumstances. Typically, but not necessarily, the conversation will be initiated by the customer by calling on the telephone.

During the initial customer interview, the representative will gather information about the customer and the customer's needs and will determine what action is appropriate for the particular project desired by the customer. An account will be opened for the customer if one does not already exist. In some cases, the interview will indicate that the customer is seeking products or services that the provider does not provide. In other cases, the interview will lead the representative to conclude that the quick design tools, described below, cannot be productively employed for this customer, either because the customer does not have co-browsing ability or because the scope or nature of the desired project requires significant time or effort, requires special tools or expertise not immediately available to the representative, or otherwise is unsuitable for "real time" development by the representative. As used herein, co-browsing ability means that the customer has simultaneous access to both a communication connection and a Web connection such that the customer and the representative can be conversing while viewing Web pages.

For many customer projects, the representative will be able to use quick design tools 142 to either complete a design that meets with the customer's approval during the initial conversation or to at least make significant progress toward a final design such that the time to final completion of the design task is reduced. At step 204, the representative will decide whether the initial engagement will continue using quick design tools 142 or will terminated. At step 206, if customer does not have co-browsing ability or if the representative for other reasons believes that the scope or nature of the customer's project indicates that quick design tools 142 are not appropriate, the project is identified as an "off line" design process. The customer is informed at step 208 that the design will be created at a later time or by another representative. The customer is given appropriate instructions regarding when and how the created design will be provided to the customer for review. At step 206, if it is obvious to the representative that the particular product or service desired by the customer is not provided by the service provider, the representative informs the customer accordingly and terminates the engagement at step 210.

In those situations where the customer is able to co-browse and where the project is appropriate for immediate design, the representative will immediately initiate the design process at step 204.

A goal of the service provider is to prepare a customized design that meets the requirements of the customer during the course of a single conversation without requiring the customer to endure long wait periods. As a part of conversation at step 202, the representative collected relevant customer information. This typically included both specific content information intended to be incorporated into the product design and general information about the customer and the purposes of the design. To the extent practical, the representative will seek information from the customer, such as the type of business or activity, the general style or feeling that the customer wants the product to convey, and any other details that could be useful to the representative in selecting images, fonts, colors and other elements to be used in the product design. The representative uses this information to formulate one or more keywords for identifying suitable candidate images from images 154 to be used in preparing designs for review by the customer.

For illustrative purposes, the example of a customer desiring a custom business card design will be discussed, but it will be understood that the invention could be employed to design a wide range of products. At step 212, the representative searches for appropriate images using one or more keywords related to the customer's business activities or the content or purpose of the particular product being designed. DSS 120 retrieves images associated with the specified keywords from images 254 and automatically creates an initial set of six initial designs by combining at least some of the retrieved images with six pre-selected six business card layout and font combinations.

DSS 120 displays the created designs to the representative on RDV 144 for preliminary review prior to making the images available to the customer. At step 214, the representative may decide that one or more of the initial automatically assembled images are not suitable or appropriate. If the representative desires to modify one or more designs, at step 216 the representative can use quick design tools 142 to request modifications to the designs and cause a new set of designs to be generated for further representative review.

When the designs are acceptable to the representative at step 214, at step 218 the representative will orally instruct the customer on how to access CDV 168 to review the designs. Various techniques could be used to guide the customer to CDV 168 in a simple and easy way. For example, if the CDV 168 URL is not excessively long or complicated, the representative could dictate the URL to the customer such that the customer could directly type the URL into the customer's browser address field. Alternatively, the URL could be sent to the customer in an email or the customer could be given a relatively simple temporary access code or password to enter on the provider's home page or other easily accessible page.

CDV 168 and RDV 144 will both display the identical set of design images, but will differ in other content. As will be discussed below in connection with FIG. 3, RDV 144 will provide edit controls to the representative that are not seen or useable to the customer allowing the representative to control the manner in which the images will be revised.

While the representative and the customer are simultaneously viewing the designs, the representative will query the customer to determine what the customer like or dislikes about the designs. If one of the initial designs happens to be completely satisfactory to the customer at step 222, the representative will guide the customer into the provider's purchase process at step 224. If the customer is not ready to purchase, the representative may decide at step 226 that the current quick design process should be terminated, either by starting the off line design process at step 208 or terminating the engagement entirely at step 210. If the representative believes that further revisions to the designs could lead to a satisfactory product or, at least, serve to move the design closer to something acceptable to the customer prior to entering an off line design phase, the representation will choose to continue the current engagement process.

As the customer and the representative are discussing the customer's preferences relative to the current set of designs, the representative will be manipulating the quick design tools at step 216. When the representative has gathered the customer's comments and set the controls as desired, the representative will request DSS 120 to generate a new set of designs as determined by the settings of the tools. The representative reviews the designs at step 214 and, if desired, makes one or more revisions prior to making a set of new designs available to the customer. When the representative is satisfied with the new designs, the representative causes the new set of images to be made available to the customer on CDV 168. This iterative process of discussion and revision can be repeated until the customer selects a design for purchase at step 222 or until the customer or the representative determines at step 226 that the quick design process is no longer productive. Termination at step 226 could be appropriate either because some additional design preparation needs to be done as part of an offline process at step 208 or because the representative or the customer decides to completely terminate the engagement at step 210.

Figure 3:
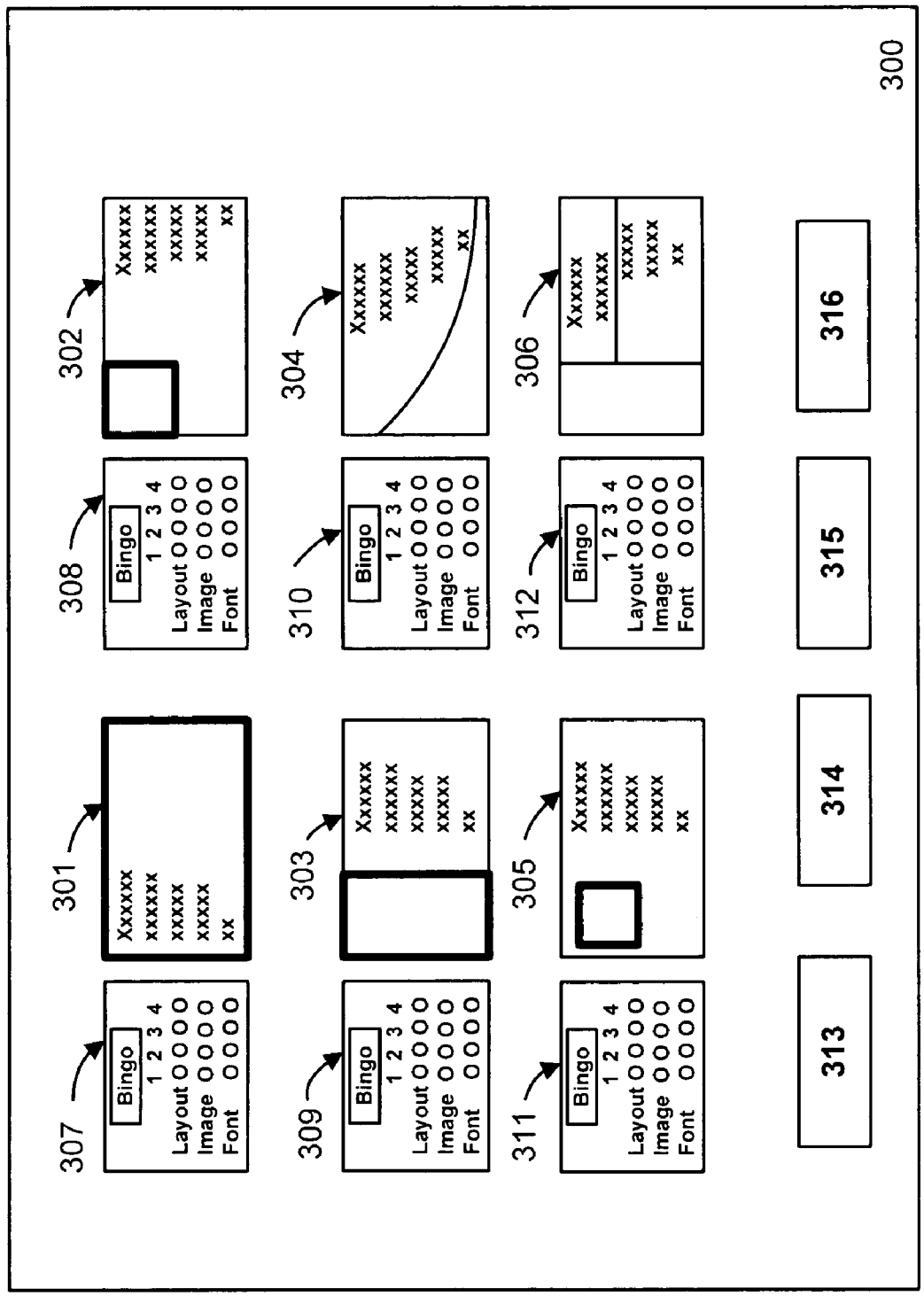
FIG. 3 is an illustrative representation of quick design tools.

Turning now to FIG. 3, a representative embodiment of RDV 144 as displayed to a representative for creating a business card design will be discussed. In this example, six candidate designs 301-306 are displayed. A greater or lesser number of designs could have been used. Some customers may desire a card with a photograph or other image while other customers may desire a more simple design. The initial six designs are created to display a range of possible choices. In the disclosed embodiment, some designs contain images while others do not. In FIG. 3, image areas in the designs are indicated in bold. For example, in design 301 the entire card is covered by an image, in design 302 the upper left corner is occupied by an image, and so forth. Designs 304 and 306 do not contain an image, but have features like the curved line in design 304 and the intersecting lines in design 306. The designs also shown the customer's personal contact information, or placeholder text for any pieces of customer information that are not available, all indicated generically in FIG. 3 by groups of Xs. In a typical engagement, during step 202 the representative would have collected the customer's name, address and other information desired to be incorporated into the product and recorded it using other components of representative tools 140.

Each design 301-306 is associated with a corresponding set of edit controls 307-312, discussed in more detail below, for allowing the representative to indicate the preferences of the customer and quickly generate a revised set of designs reflecting the preferences. RDV 144 also contains control buttons 313-316. Button 313 allows the representative to access image selector 500, discussed below. Button 314 allows the representative to access font selector 600, discussed below. Button 315 allows the representative to initiate the creation of a new set of images after the representative has manipulated controls 307-312 as desired. Finally, button 316 allows the representative to make the six images available for viewing by the customer at CDV 168. As an alternative to the representative using button 316 without customer action, the representative could orally request the customer to refresh the CDV 168 display. Additional buttons, tools, and controls, not shown, could be provided on CDV 168 to allow the representative to perform other tasks or take other actions.

Still referring to FIG. 3, the operation of controls 307-312 will be discussed. Each set of controls is identical in structure. Radio buttons are shown in FIG. 3, but it will be understood that various other control systems could be employed. In the disclosed embodiment, three types of component elements of the design are individually controllable: the layout, the image, and the font. More or fewer individually controllable component types could have been employed. For example, in the embodiment of FIG. 3, the color scheme used for the design is not independently selectable using controls 307-312. In this embodiment, the default color scheme that is associated with the selected image is automatically used in the design. As an alternate embodiment, controls 307-312 could be adapted to make the design color scheme selectable independently from the design image.

Within each control 307-312 are three rows of radio buttons arranged into four columns of three buttons and labeled as columns 1-4. Each row of buttons is labeled with one of the three types of selectable components in the design and is used by the representative to indicate the customer's opinion, or preference level, regarding the associated component element. For each control, the button in column 1 indicates that the associated component element is undesirable and should not be used in revisions of the designs. The button in column 2 indicates that the customer is neutral or expressed no opinion regarding this component element. When controls 301-306 are initially displayed to the representative, column 2 is the default pre-selected preference level for all control buttons. The button in column 3 indicates that the customer likes this component element and is interested in seeing similar elements or seeing this same element in other combinations. The button in column 4 indicates that the customer specifically wants this component element in the customer's design. This component will be used in all revisions of the designs.

Each set of controls 301-306 also includes a "Bingo" button. When a customer sees a design that is fully satisfactory to the customer and the customer expresses a desire to purchase products using that design, the representative clicks the associated Bingo button, which automatically saves the selected combination of design components as the customer's choice.

Figure 4:
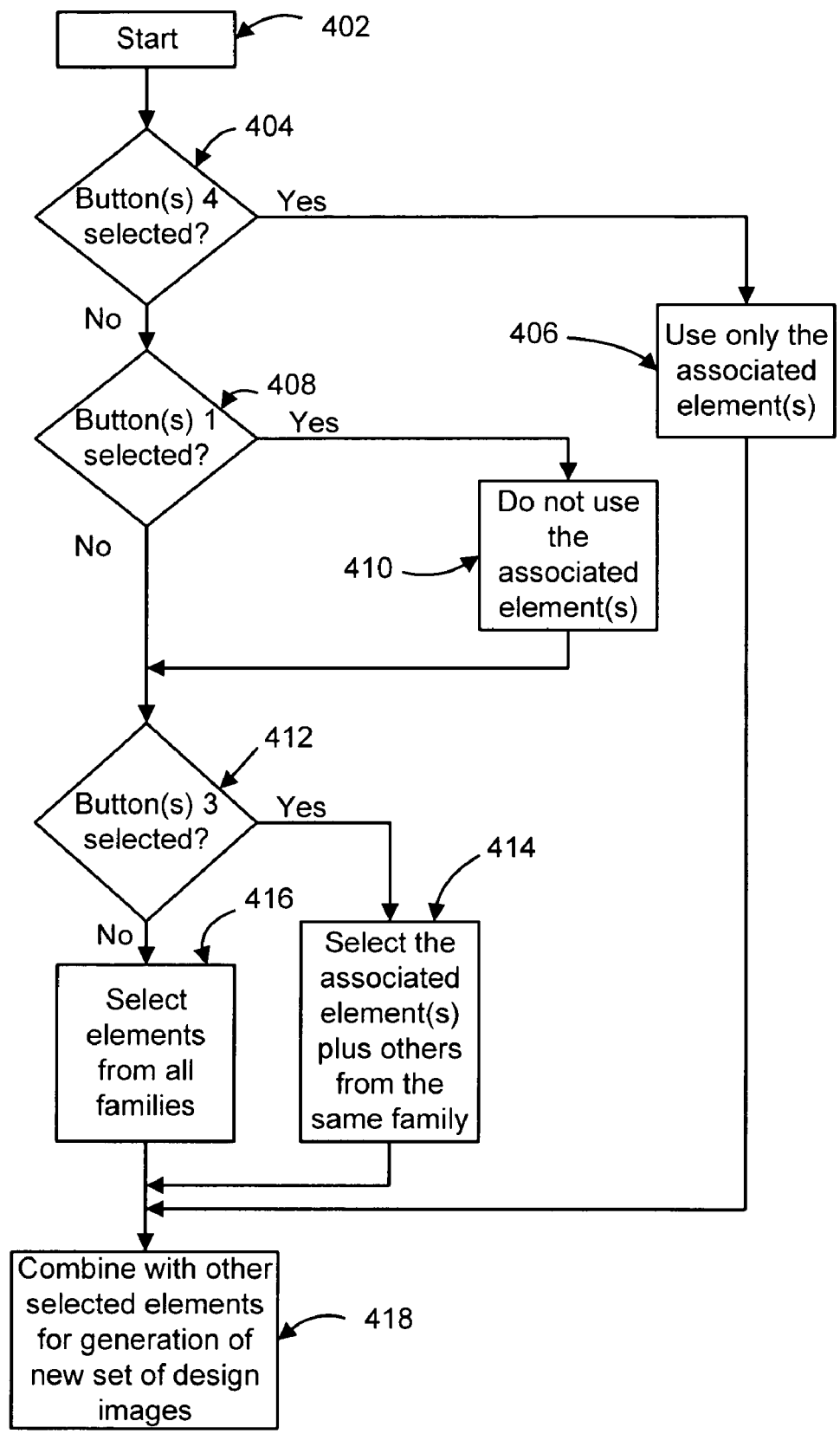
FIG. 4 is a flow chart of a representative method for using the quick design tools of FIG. 3.

Referring now to FIG. 4, a process for interpreting the representative's manipulations of controls 307-312 will be discussed. The layout, image, and font are controlled independently; therefore the outcome in FIG. 4 is independently determined for layout, image and font. In the disclosed embodiment, the provider has manually divided the available layouts into four families of similar layouts based on overall appearance factors, such as the size and position of image containers and arrangement of text. Similarly, the provider has manually divided the available fonts into four families of similar fonts based on the overall style and appearance of the fonts. The choice of using four families is not significant and more or fewer family divisions could have been employed. The set of images retrieved based on the keywords entered by the representatives is treated as a single family.

As mentioned above, in response to comments made by the customer, the representative will change the preference level status of one or more of the controls 307-312. When the representative has made the appropriate changes, the representative selects button 313 at step 313, causing DSS 120 to prepare a set of six new designs based on the status of controls 307-312.

At step 404, if one or more column 4 buttons are selected, at step 406 the associated component element or elements are selected for use in all of the next six designs. No other elements of that component type (layout, image, or font) will be used in the next designs except the element or elements that were assigned a preference level of 4.

At step 408, if one or more column 1 buttons were selected, at step 410 any component elements assigned a column 1 preference level are eliminated from the available elements and will not appear in the next set of designs. At step 412, if one or more column 3 buttons are selected for a font or a layout, the associated component element or elements, and members of the same element family or families, will be used in the next designs. At step 416, if no column 3 or 4 preference level was selected for the component type in any control 307-312, DSS 120 will, after eliminating any elements associated with a column 1 preference level, select the components to be used in the modified designs from all available families. In selecting the component elements to be used for the next set of designs, DSS 120 could select the most popular elements or use any of various other techniques, such as round robin or random selection. When the customer's preferences regarding the component elements for each component type in the current designs preference levels have been taken into account, new candidate designs are created by DSS 120 at step 520.

Figure 5:
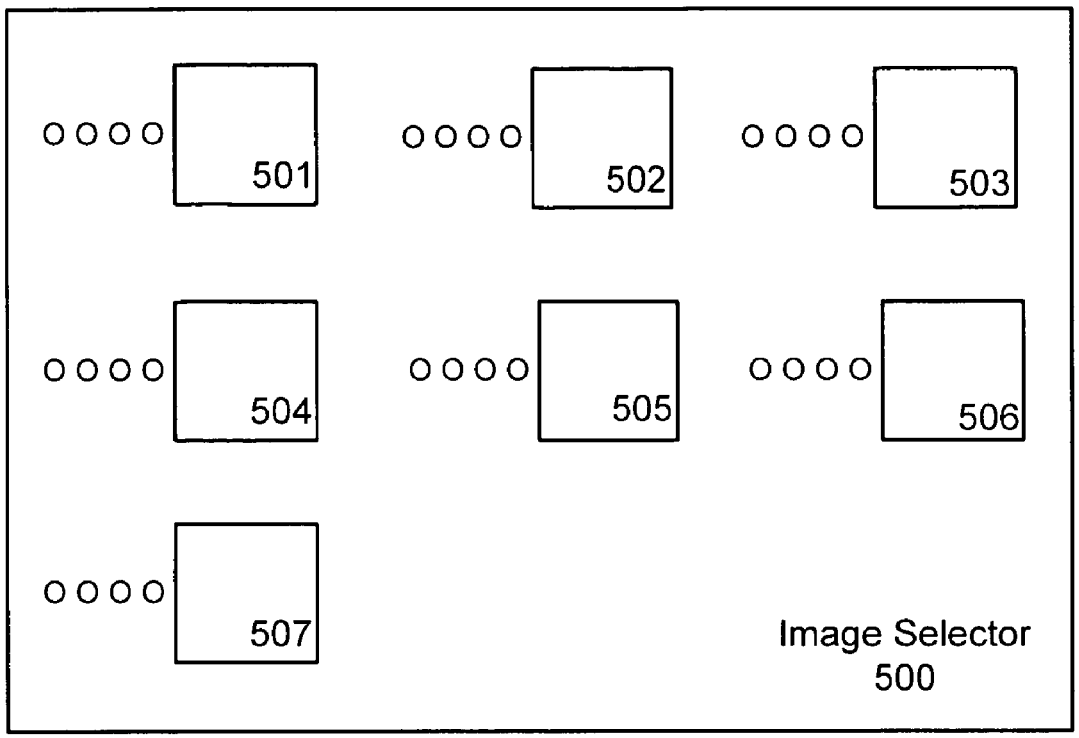
FIG. 5 is an illustrative representation of an image selection tool.
Figure 6:
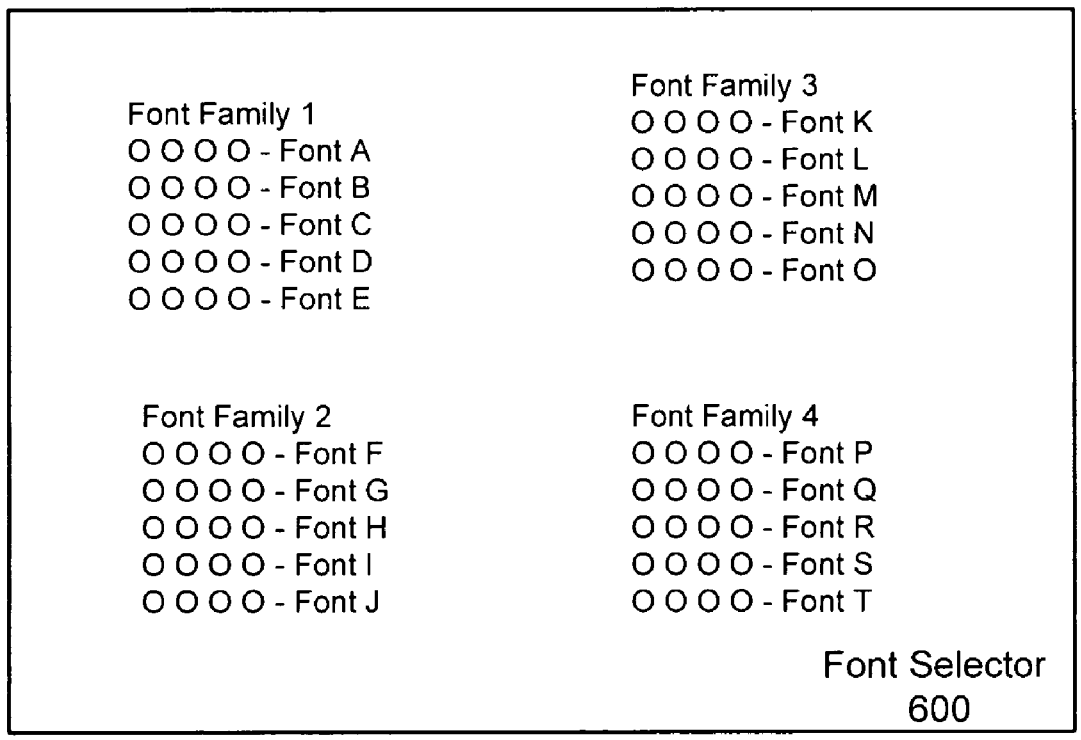
FIG. 6 is an illustrative representation of a font selection tool.

Because images are considered to be a single family in the disclosed embodiment, the column 3 button for the image component will not be active and will not be used by the representative. The representative will, if appropriate, use image selector 500 to manually choose or eliminate other available images. Image selector 500 is accessed from display 300 by button 313 and displays the set of images that are associated with the keyword or keywords entered by the representative. In the example, shown in FIG. 5, the keyword search returned seven images 501-507 associated with that keyword or keywords. Associated with each image is a single row of radio buttons similar in arrangement and function to the buttons in controls 307-312. Initially, the neutral second button is selected.

If the representative selects the first, or leftmost, preference level button for one or more images, that image or images will not be used in the next set of designs. If the user selects the fourth, or rightmost, button for one or more images, that image or images will be the only images used in the next set of candidate designs. As mentioned above, while four radio buttons are always displayed in connection with entering preferences for all types of components, the third button is not used for image preferences and is deactivated. If no fourth button preference is selected, all of the images, except the images having a first button preference selection, will be available for selection and use in future designs.

If a relatively large number of font choices are provided, the representative may also choose to provide the representative with a font selection tool, such as font selector page 600, allowing the representative to select a font or font family independently of controls 307-312. Selector 600 displays examples of the fonts organized by the font families established by the provider. Each font has an associated set of four radio buttons for selecting preference levels, again initially all set to the second neutral default position. If the representative selects the first, or leftmost, preference level button for one or more fonts, that font or fonts will not be used in the next set of designs. If the representative selects the fourth, or rightmost, preference level button for one or more fonts, that font or fonts will be the only fonts used in the next set of candidate designs. Selection of the third button for one or more fonts will cause that one or more fonts to appear in future designs plus other fonts chosen from the same family. If no preference levels 3 or 4 are selected, all fonts, except any fonts having a first button preference level, will be available for font component selection.

While an exemplary embodiment of the invention has been discussed, the described embodiment is to be considered as illustrative rather than restrictive. For example, while quick design tools 142 has been discussed in the context of a design services tool that is used "internally" by representatives of a service provider for the benefit of remote customers, a representative is not essential to the use of the tool The tool could readily be provided for direct customer use as a "self service" custom product design tool on the service provider's Web site. The scope of the invention is as indicated in the following claims and all equivalent methods and systems.

What is claimed is:

1. A computer-implemented method for creating two or more modified designs, the method comprising:
   providing two or more designs for simultaneous displaying to a reviewer, each design having a plurality of design components, and each design component having a corresponding selected value,
   providing at least one control adapted to allow the reviewer to manually select one or more preference levels corresponding to one or more design components in the designs, each preference level indicating a user's opinion as to a relative desirability or lack of desirability of the selected value of the corresponding design component,
   receiving preference levels selected by the reviewer,
   generating two or more different modified designs in accordance with the received preference levels, the modified designs including corresponding design components having corresponding selected values that are the same or similar to the selected values of the respective design components of the two or more designs whose corresponding preference level indicates a relatively higher desirability and excluding corresponding design components having corresponding selected values that are the same or similar to the selected values of the respective design components of the two or more designs whose corresponding preference level indicates a relatively lower desirability, and
   providing the modified designs for simultaneous displaying to the reviewer.

2. The method of claim 1 further comprising providing the plurality of designs for displaying to a second reviewer, the second reviewer being in communication with the first reviewer and wherein the reviewer selects preference levels in accordance with preferences communicated to the reviewer by the second reviewer.

3. The method of claim 2 wherein the plurality of designs is provided to the reviewer for review prior to being provided to the second reviewer for review.

4. The method of claim 1 wherein a design component is used in all modified designs if the preference level for that design component is set to a first preference level.

5. The method of claim 1 wherein a design component is not used in any modified designs if the preference level for that design component is set to a second preference level.

6. The method of claim 1 further comprising repetitively
   receiving selected preference levels selected by the reviewer for at least some of the design components in the modified designs and,
   generating two or more new modified designs in accordance with the most recently received preference levels.

7. One or more computer readable media having embodied therein computer program code for creating two or more modified designs, the code comprising
   code for providing two or more designs for simultaneous displaying to a reviewer, each design having a plurality of design components, and each design component having a corresponding selected value,
   code for one or more preference levels corresponding to one or more design components in the designs, each preference level indicating a user's opinion as to a relative desirability or lack of desirability of the selected value of the corresponding design component,
   code for receiving preference levels selected by the reviewer,
   code for generating two or more different modified designs in accordance with the received preference levels, the modified designs including corresponding design components having corresponding selected values that are the same or similar to the selected values of the respective design components of the two or more designs whose corresponding preference level indicates a relatively higher desirability and excluding corresponding design components having corresponding selected values that are the same or similar to the selected values of the respective design components of the two or more designs whose corresponding preference level indicates a relatively lower desirability, and
   code for providing the modified designs for simultaneous displaying to the reviewer.

8. The computer readable media of claim 7 further comprising code for providing the plurality of designs for displaying to a second reviewer, the second reviewer being in communication with the first reviewer and wherein the reviewer selects preference levels in accordance with preferences communicated to the reviewer by the second reviewer.

9. The computer readable media of claim 7 wherein the code for generating two or more modified designs in accordance with the received preference levels utilizes a design component in all modified designs if the preference level for that design component is set to a first preference level.

10. The computer readable media of claim 7 wherein the code for generating two or more modified designs in accordance with the received preference levels does not utilize a design component in any modified designs if the preference level for that design component is set to a second preference level.

11. The computer readable media of claim 7 further comprising code for repetitively receiving selected preference levels selected by the reviewer for at least some of the design components in the modified designs and, generating two or more new modified designs in accordance with the most recently received preference levels.

12. A system for creating two or more modified designs, the system comprising:
   one or more processors; and
   one or more computer readable media having embodied therein computer code which, when executed by the one or more processors, executes a method for creating two or more modified designs, the method comprising:
   providing two or more designs for simultaneous displaying to a reviewer, each design having a plurality of design components, and each design component having a corresponding selected value,
   providing at least one control adapted to allow the reviewer to select one or more preference levels corresponding to one or more design components in the designs, each preference level indicating a user's opinion as to a relative desirability or lack of desirability of the selected value of the corresponding design component,
   receiving, via the at least one control, preference levels selected by the reviewer,
   generating two or more different modified designs in accordance with the received preference levels, the modified designs including corresponding design components having corresponding selected values that are the same or similar to the selected values of the respective design components of the two or more designs whose corresponding preference level indicates a relatively higher desirability and excluding corresponding design components having corresponding selected values that are the same or similar to the selected values of the respective design components of the two or more designs whose corresponding preference level indicates a relatively lower desirability, and
   providing the modified designs for simultaneous displaying to the reviewer.

* * * * *